United States Patent
Dotaro et al.

(10) Patent No.: US 7,024,114 B2
(45) Date of Patent: Apr. 4, 2006

(54) PHOTONIC SWITCHING DEVICE

(75) Inventors: Emmanuel Dotaro, Verrieres le Buisson (FR); Nicolas Le Sauze, Bures-sur-Yvette (FR)

(73) Assignee: Alcatel, Paris (FR)

( * ) Notice: Subject to any disclaimer, the term of this patent is extended or adjusted under 35 U.S.C. 154(b) by 657 days.

(21) Appl. No.: 09/987,245

(22) Filed: Nov. 14, 2001

(65) Prior Publication Data

US 2002/0093704 A1    Jul. 18, 2002

(30) Foreign Application Priority Data

Jan. 15, 2001    (FR)    ................................. 01 00460

(51) Int. Cl.
*H04J 14/00*    (2006.01)

(52) U.S. Cl. .............................. 398/53; 398/45; 398/46; 398/47; 398/48; 398/49; 398/50; 398/51; 398/52; 398/54; 398/55; 398/56; 398/57; 370/60; 370/85.6; 385/24; 385/16; 385/17; 385/18

(58) Field of Classification Search .................. 385/16, 385/24, 17, 18; 370/60, 85.6; 398/57, 56, 398/55, 54, 53, 52, 51, 50, 49, 48, 47, 46, 398/45, 63, 75
See application file for complete search history.

(56) References Cited

U.S. PATENT DOCUMENTS

| | | | | |
|---|---|---|---|---|
| 5,416,769 A | * | 5/1995 | Karol | 370/414 |
| 5,438,566 A | * | 8/1995 | Masetti et al. | 370/355 |
| 5,828,472 A | * | 10/1998 | Masetti | 398/47 |
| 5,841,556 A | * | 11/1998 | Hong et al. | 398/46 |
| 6,819,870 B1 | * | 11/2004 | Ge et al. | 398/51 |

FOREIGN PATENT DOCUMENTS

EP    0 790 750 A1    8/1997

OTHER PUBLICATIONS

D. K. Hunter et al, "Buffering in Optical Packet Switches", Journal of Lightwave Technology, IEEE, New York, vol. 16, No. 12, Dec. 1998, pp. 2081-2094 -, XP000833955.

* cited by examiner

*Primary Examiner*—Hanh Phan
(74) *Attorney, Agent, or Firm*—Sughrue Mion, PLLC

(57) ABSTRACT

A photonic switching device for switching without contention data in the form of optical packets includes a space switching matrix with a plurality of input ports and a plurality of output ports. A unit external to the space switching matrix includes a buffer memory common to all the output ports of the matrix. Each of the output ports provides access to the buffer memory via a space switching stage consisting of switches having a 1-to-2 switching function.

7 Claims, 1 Drawing Sheet

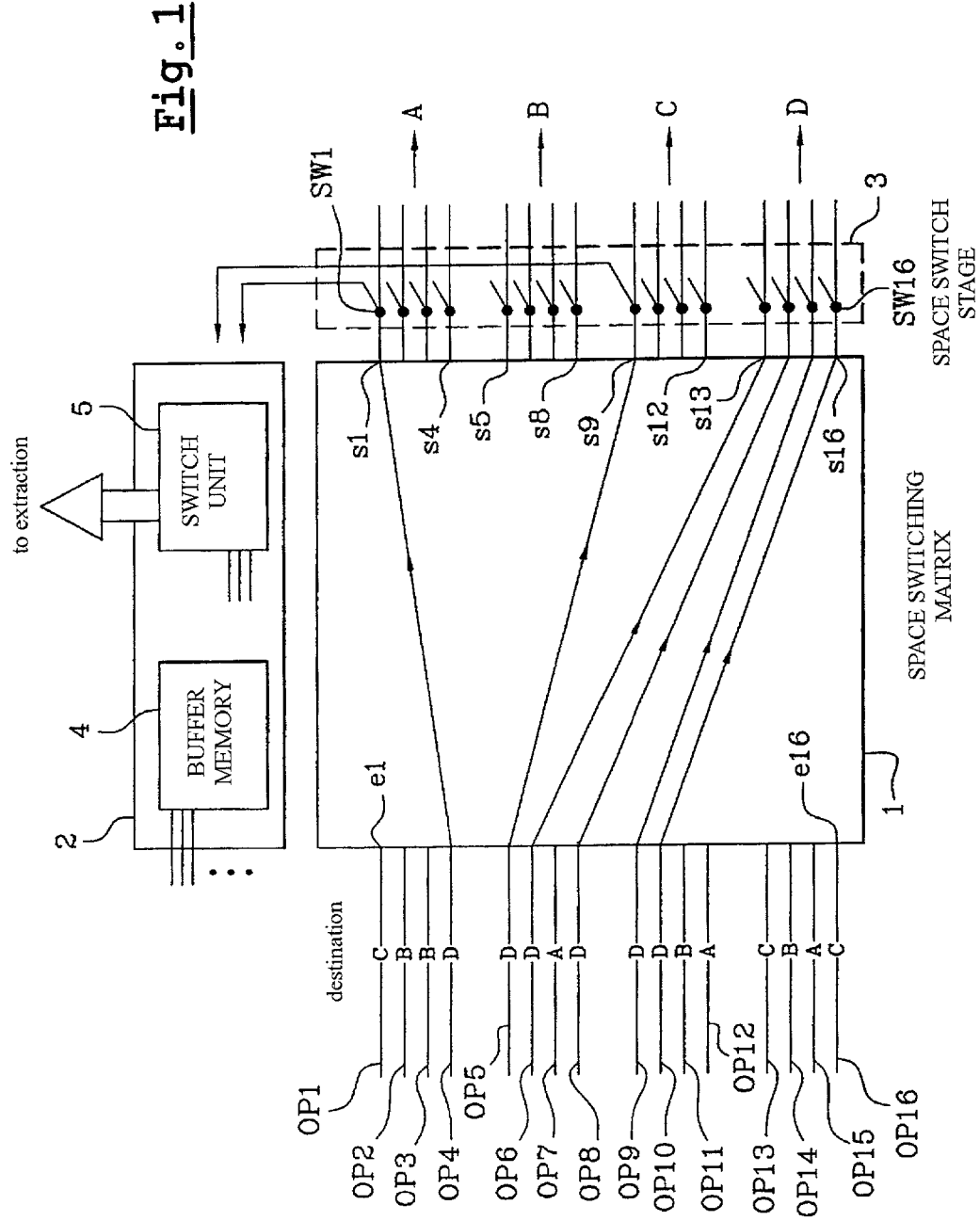

PHOTONIC SWITCHING DEVICE

CROSS-REFERENCE TO RELATED APPLICATIONS

This application is based on French Patent Application No. 01 00 460 filed Jan. 15, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a photonic switching device for switching data taking the form of digital optical signals constituting optical packets.

2. Description of the Prior Art

An optical packet is typically a protocol data unit (PDU) which, in the context of the present application, can be either fixed or variable. Consequently, this does not imply any restrictive hypothesis as to the format of the optical packet and the manner in which the packet is filled.

An optical packet arriving at an input port of a switching matrix contains routing information that can be used to route the packet within the switching matrix to one or more output ports.

A photonic switching matrix includes a plurality of input ports and a plurality of output ports. Thus it can happen that optical packets from a plurality of input ports must be switched to the same output port. Thus a plurality of optical packets intended for the same output port can arrive simultaneously, creating a conflict phenomenon known as contention.

In the prior art, this contention problem is solved by using buffer memories. Thus buffer memories can be disposed within the switching matrix. In this type of switching matrix, which is provided with a centralized buffer memory, the optical data packets supplied by the input ports are stored as they arrive and are then supplied to the output ports one by one. The buffer memory is controlled as a function of routing information indicating for each data packet to be switched the output port of the matrix to which that data packet is intended. Control means select the storage time in the buffer memory to constitute a queue for each output, avoiding conflicts between two data packets to be switched to the same output and reaching the input of the switching matrix at the same time.

While it is being routed between an input port and an output port, the optical data packet is therefore routed to an optical buffer memory common to all the outputs of the matrix, in which it is stored for a time period that can be selected between 0 and K.Tc, K being an integer and Tc being the duration of a data packet. The duration of a data packet is the time necessary to transmit a data packet to an output port. A buffer memory consists of optical delay lines that supply data packets staggered in time to the same output port.

However, this type of architecture, in which contention is resolved within the matrix itself, has a number of disadvantages. In particular, in this type of architecture all the traffic enters the memories. Now, buffer memory being a rare resource in optics, this architecture is deficient in terms of statistical division multiplexing. Moreover, consuming buffer memory resources, the prior art architecture described above is costly and complex to implement.

There are also architectures in which the buffer memory is external to the switching matrix.

The invention relates to this latter type of architecture, in which the buffer memory is external to the switching matrix.

In prior art architectures of this type, the buffer memory is shared for all the traffic in conflict. Thus only the traffic in conflict uses the buffer memory resource. Also, some output ports of the switching matrix are specifically dedicated to buffer memory access.

With this type of architecture a number of ports dedicated to buffer memory access are added and, when contention occurs, the optical packets that can be switched are sent over the normal lines.

Consequently, the size of the matrix is increased to enable sufficient buffer memory access whilst retaining acceptable performance in terms of the average bit rate at each input port.

One of the major disadvantages of this type of architecture, with a buffer memory external to the matrix and dedicated ports for buffer memory access, is therefore that it requires an increase in the size of the matrix of the order of 20 to 25% to achieve correct switching performance.

Also, the problem that the invention proposes to solve is that of using a photonic switching matrix in which there is no longer any contention between the optical packets, whilst alleviating the disadvantages of the prior art described above, which relate in particular to the use of the buffer memory resource and to the size of the switching matrix. The object of the invention is therefore to propose a photonic switching matrix that is simpler and less costly than prior art matrices.

To this end, the invention starts from the observation that no more traffic can leave a node than enters the node. Accordingly, when contention occurs, there are as many free output ports as there are optical packets in contention. The invention then consists in using the existing output ports to access the buffer memory. To this end, a 1-to-2 switching function is provided behind the output ports of the matrix. In this way, all the output ports of the matrix are a potential point of access to the buffer memory.

SUMMARY OF THE INVENTION

The invention therefore provides a photonic switching device for switching without contention data in the form of optical packets, the device including a space switching matrix with a plurality of input ports and a plurality of output ports and a unit external to the space switching matrix including a buffer memory common to all the output ports of the matrix, wherein each of the output ports provides access to the buffer memory via a space switching stage consisting of switches having a 1-to-2 switching function.

The invention will be better understood and other features and advantages will become more clearly apparent from the following description of one embodiment of the invention, which is given with reference to the single figure of the accompanying drawing.

BRIEF DESCRIPTION OF THE DRAWING

FIG. 1 is a diagrammatic representation of a photonic switching device according to the present invention.

DETAILED DESCRIPTION OF THE PREFERRED EMBODIMENT

FIG. 1 therefore shows an N×N space switching matrix 1. In the FIG. 1 example, N is equal to 16. The matrix 1 therefore has 16 input ports e1, ..., e16 and 16 output ports s1, ..., s16. Of the 16 output ports of the matrix, output ports s1 to s4 are dedicated to destination A, ports s5 to s8 to destination B, ports s9 to s12 to destination C, and, finally, ports s13 to s16 to destination D.

A unit 2 external to the space switching matrix 1 includes an optical buffer memory 4 common to all the outputs of the matrix 1. The buffer memory 4, which is external to the matrix, is provided for selectively delaying each optical packet in contention, i.e. the packets to be switched to the same destination and thus in conflict.

The buffer memory preferably consists of optical delay lines. An optical emitter, not shown in FIG. 1, is placed after the buffer memory for regenerating the optical packets stored in the buffer memory to send them to input ports of the matrix 1 referred to as recirculation ports.

Each of the output ports s1 to s16 has a 1-to-2 space switching function. To this end, the device includes a space switching stage 3 consisting of 16 1-to-2 switches SW1 to SW16. Each output port s1 to s16 of the matrix 1 therefore provides access to the buffer memory 4 via the space switching stage 3 consisting of the switches SW1 to SW16 providing a 1-to-2 space switching function.

Sixteen optical packets OP1 to OP16 arrive at the respective sixteen input ports e1 to e16 of the photonic switching matrix 1.

In the FIG. 1 example, a conflict occurs between optical packets for destination D. Six optical packets OP4, OP5, OP6, OP8, OP9 and OP10 that arrive at the same time are intended to be switched to the output port D of the matrix 1. However, only four output ports s13 to s16 are available.

Firstly, all the optical packets in transit that can be processed without contention are assigned to the output ports of the matrix dedicated to destination D. Accordingly, the optical packets OP6, OP8, OP9 and OP10 are respectively assigned to the output ports s13 to s16 of the matrix 1.

The remaining two optical packets OP4 and OP5, which are optical packets to be switched to the same destination D and thus in conflict, are assigned to free output ports of the matrix, namely the ports s1 and s9 in the FIG. 1 example, in order to be able to access the buffer memory 2.

Returning to the original postulate of the invention, there cannot be more incoming traffic than outgoing traffic at a node so that, if contention occurs, there are as many output ports free as there are optical packets in contention.

Thus, the output ports s1 and s9, which are existing ports of the matrix 1, and which are not used when there is contention, provide access to the buffer memory via the switches SW1 and SW9.

All the existing output ports s1 to s16 of the matrix 1 therefore become a potential point of access to the buffer memory, thanks to the switches SW1 to SW16 added behind each of them. It is therefore not necessary to provide ports specifically dedicated to buffer memory access.

Various solutions can be envisaged for implementing the switching function of the switches SW1 to SW16 enabling optical packets in conflict to access the buffer memory from existing output ports of the photonic switching matrix.

Thus the optical signal can be regenerated by means of an opto-electronic switch. A device of this kind includes an optical receiver, for example a photodiode, and an optical emitter, for example a light-emitting diode or a laser diode, providing a light source. Regeneration being based on opto-electronic components, the data can be diverted directly to the buffer memory, which is an electronic buffer memory in this case, just ahead of the optical emitter.

In a different embodiment, the switching function behind each of the output ports of the matrix is implemented using optical amplifier switches. An optical amplifier allows the signal to pass when it is turned on and eliminates the optical link on which it is disposed when it is turned off.

Finally, another implementation of the switching function simply captures the signal and switches it to the optical buffer memory.

The respective switches SW1 to SW16 placed behind each output port s1 to s16 of the matrix therefore enable optical packets in contention to access the buffer memory via existing output ports of the matrix.

It is therefore unnecessary to provide output ports specifically dedicated to buffer memory access. According to the basic principle of the invention, because there is no more outgoing traffic from the node than incoming traffic to the node, there are as many free output ports as there are optical packets in contention.

Those free output ports are then used to access the buffer memory via switches placed behind them.

The same principle can also be applied to access to the extraction ports, which are also a cause of loss of optical packets because of contention problems in prior art architectures.

Accordingly, the output ports of the matrix that are free when optical packets are in contention can be used not only for access to the buffer memory but also for access to the extraction ports.

Consequently, in this particular embodiment of the invention a switch unit 5 between the space switching stage 3 and the buffer memory 4 differentiates, on the one hand, traffic intended for extraction and, on the other hand, traffic that must pass through the buffer memory 4 in order to be delayed.

To obtain a matrix operating with zero contention, the switch 5 is made up of as many individual 1-to-2 switches as there are output ports of the matrix 1. In the FIG. 1 example, the switch 5 therefore consists of 16 individual 1-to-2 switches. To generalize, if N is the number of input and output ports of the switching matrix 1, the switch 5 is then made up of w individual switches where w=N.

The photonic switching device according to the invention therefore eliminates the problem of contention between optical packets. Another advantage of the device according to the invention is that the size of the switching matrix is approximately 20% less than in prior art architectures, although performance is improved and cost is reduced.

There is claimed:

1. A photonic switching device for switching without contention data in the form of optical packets, said device comprises:
    a space switching matrix with a plurality of input ports and a plurality of output ports and a unit external to said space switching matrix comprising a buffer memory common to all said output ports of said matrix, wherein each of said output ports provides access to said buffer memory via a space switching stage comprising switches having a 1-to-2 switching function.

2. The device claimed in claim 1, wherein said buffer memory comprises optical delay lines.

3. The device claimed in claim 1, wherein said 1-to-2 space switching function of each of said output ports of said matrix is implemented by optical amplifier switches.

4. The device claimed in claim 1, wherein said 1-to-2 space switching function of each of said output ports of said matrix is implemented by an opto-electronic switch comprising a photodiode optical receiver and a light-emitting diode or laser diode optical emitter.

5. The device claimed in claim 4, wherein said buffer memory is an electronic buffer memory.

6. The device claimed in claim 1, further comprising a switch unit disposed between said space switching stage and said buffer memory to differentiate traffic intended for extraction and traffic having to enter said buffer memory to be delayed.

7. The device claimed in claim 6, wherein said switch unit comprises as many individual 1-to-2 switches as there are output ports in the space switching matrix.

* * * * *